United States Patent [19]

Matoba

[11] Patent Number: 5,913,068
[45] Date of Patent: Jun. 15, 1999

[54] MULTI-PROCESSOR POWER SAVING SYSTEM WHICH DYNAMICALLY DETECTS THE NECESSITY OF A POWER SAVING OPERATION TO CONTROL THE PARALLEL DEGREE OF A PLURALITY OF PROCESSORS

[75] Inventor: Tsukasa Matoba, Kawasaki, Japan

[73] Assignee: Kabushiki Kaisha Toshiba, Kawasaki, Japan

[21] Appl. No.: 08/704,078

[22] Filed: Aug. 28, 1996

[30] Foreign Application Priority Data

Nov. 14, 1995 [JP] Japan .................................... 7-295587

[51] Int. Cl.[6] ..................................................... G06F 1/32
[52] U.S. Cl. ............................. 395/750.04; 395/750.08; 364/707
[58] Field of Search ........................ 395/750.04, 750.08, 395/750.03, 750.06; 364/707; 702/63; 307/66

[56] References Cited

U.S. PATENT DOCUMENTS 5,363,312 11/1994 Ninomiya ................................... 702/63
5,511,205 4/1996 Kannan et al. ...................... 395/750.06
5,664,201 9/1997 Ikedea ................................. 395/750.03

*Primary Examiner*—Meng-Al T. An
*Assistant Examiner*—Rupal D. Dharia
*Attorney, Agent, or Firm*—Finnegan, Henderson, Farabow, Garrett & Dunner, L.L.P.

[57] ABSTRACT

A computer is constituted by a plurality of CPUs having the same power consumption and the same performance. A system controller has an interrupt control section. The interrupt control section generates an interrupt with respect to a CPU to be set in the halt state in accordance with the type of power supply, the battery residual capacity, the temperature of each CPU, and the throughput of each CPU, or the system operation environment setting set by the user or system software. Alternatively, a computer is constituted by CPUs having different power consumptions and different performances. A CPU switching section switches CPUs to be simultaneously operated in accordance with the type of power supply for a system, the heat value of each CPU in operation, and the load state of each CPU in operation, or the system operation environment settings set by the user or system software.

31 Claims, 7 Drawing Sheets

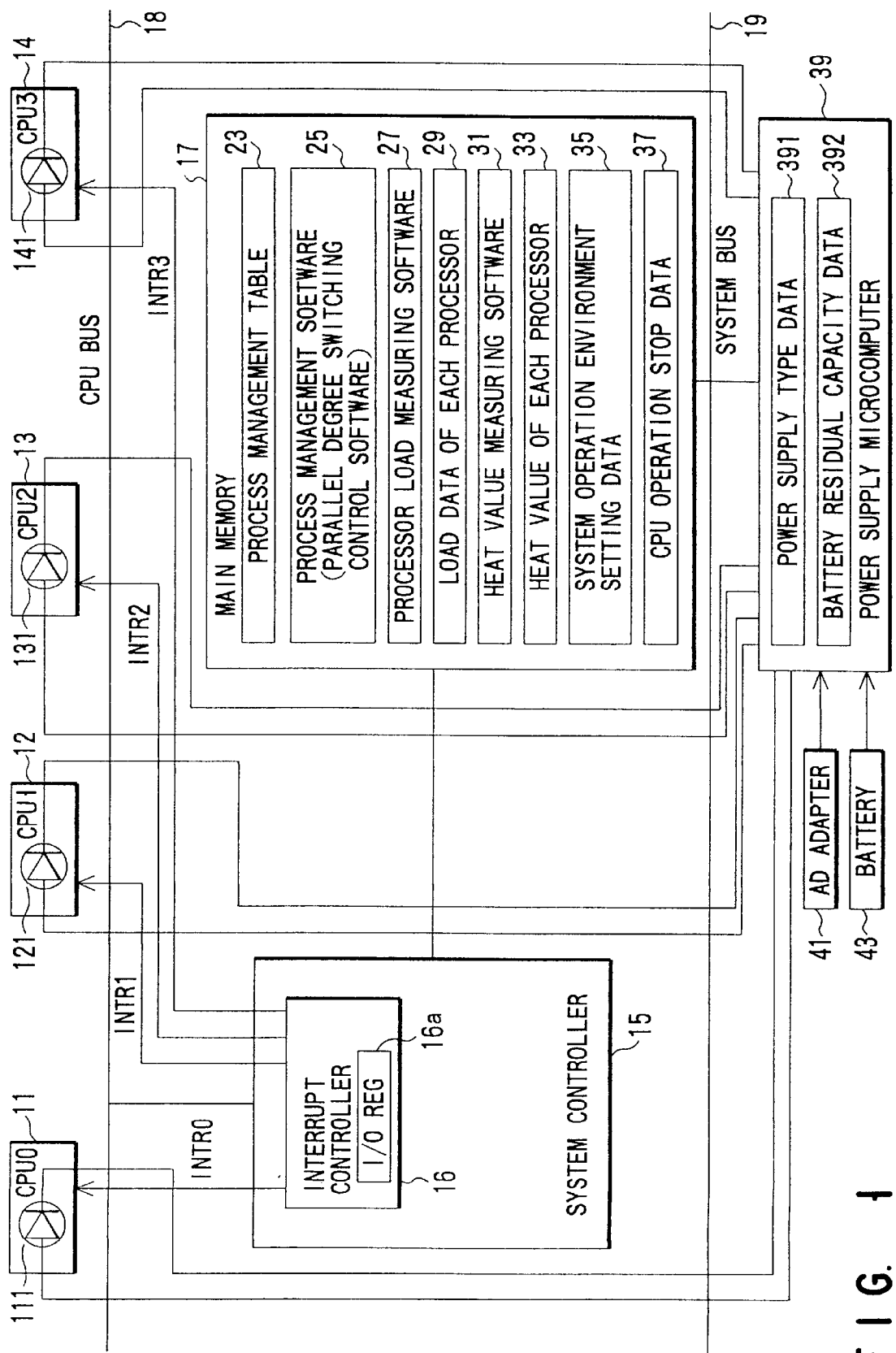
F I G. 1

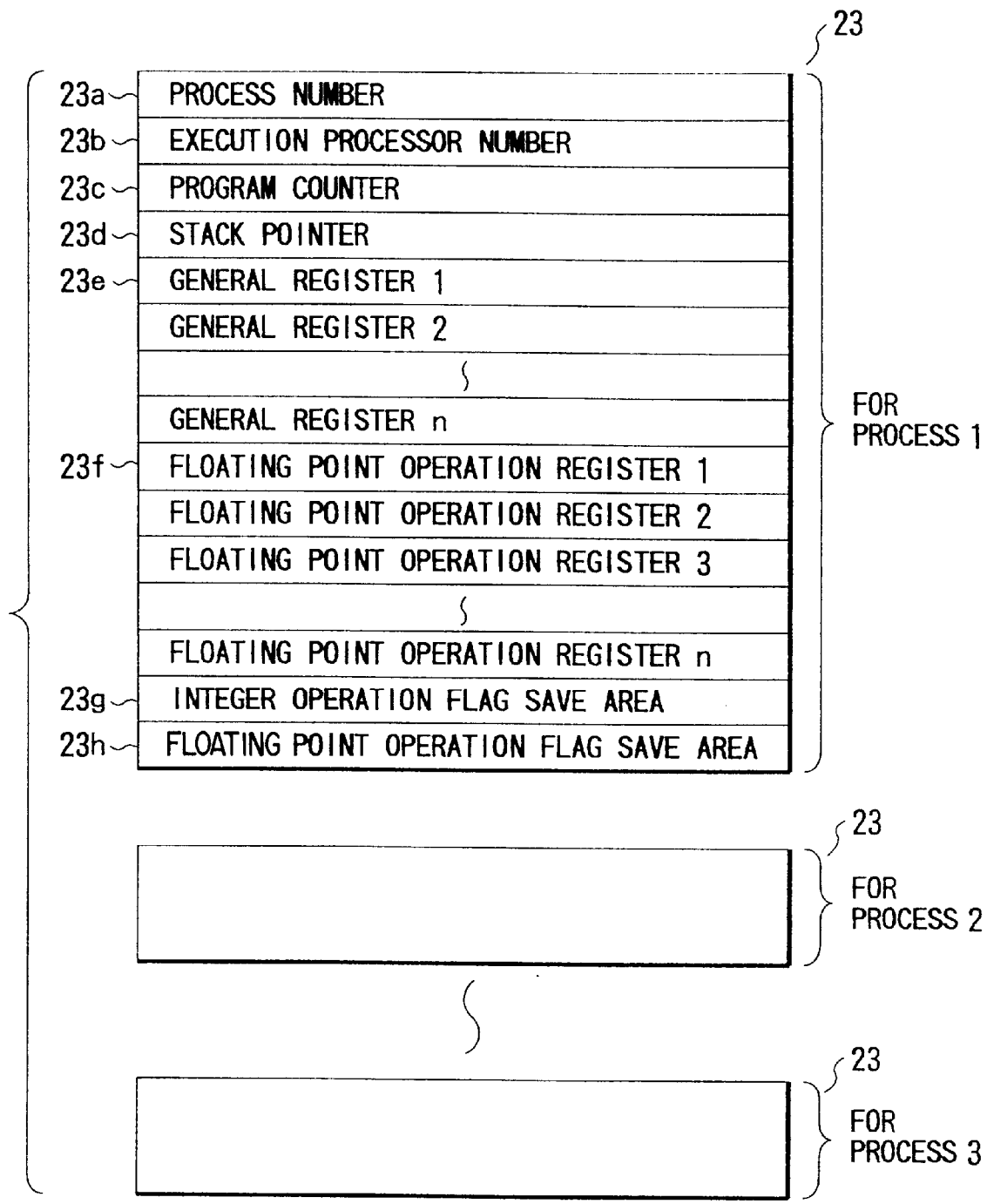
F I G. 2

CPU OPERATION/STOP DATA

| CPU0 | CPU1 | CPU2 | CPU3 |
|------|------|------|------|
| 1    | 1    | 0    | 0    |

1: IN OPERATION
0: AT HALT

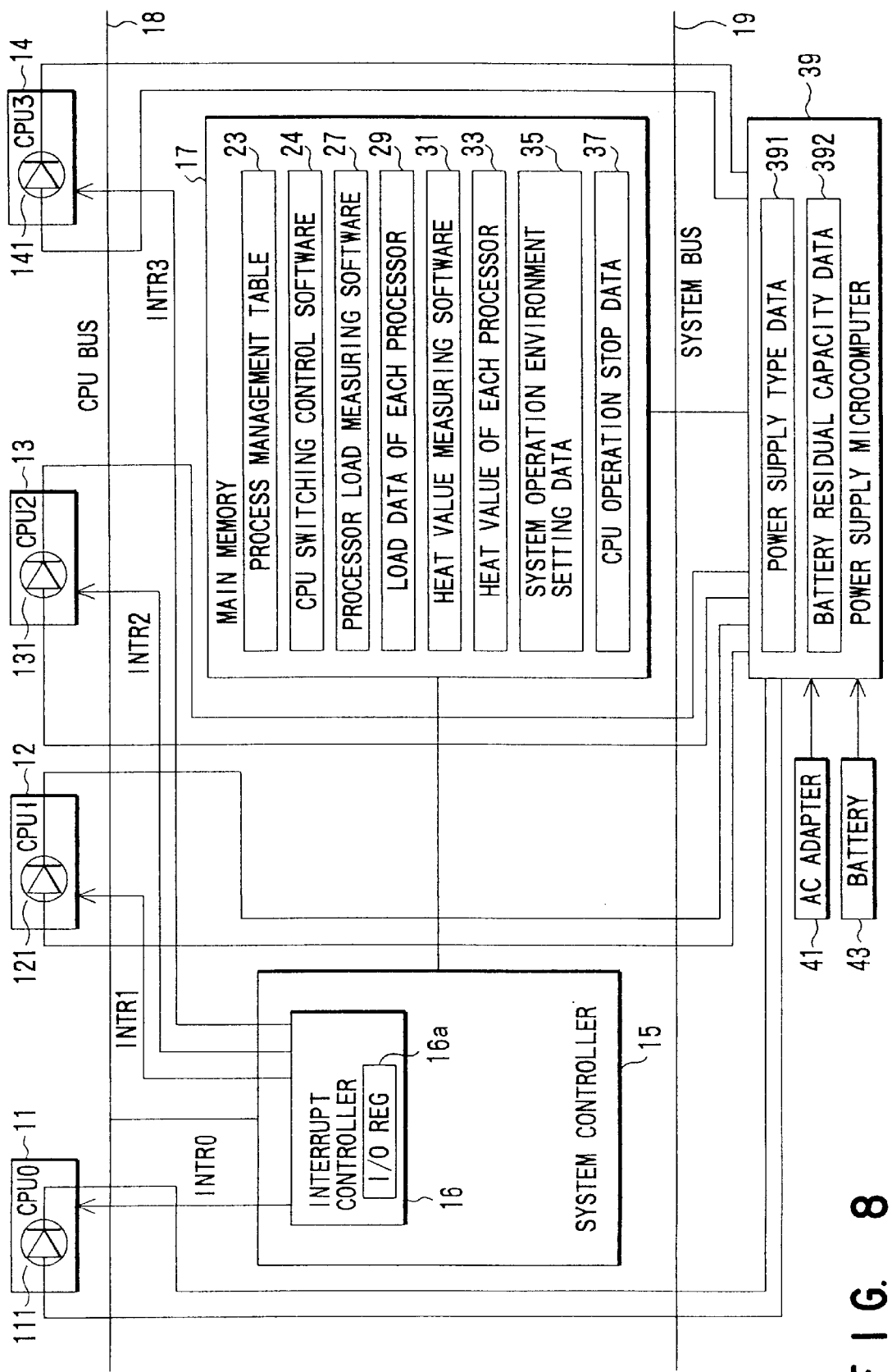
F I G. 8

MULTI-PROCESSOR POWER SAVING SYSTEM WHICH DYNAMICALLY DETECTS THE NECESSITY OF A POWER SAVING OPERATION TO CONTROL THE PARALLEL DEGREE OF A PLURALITY OF PROCESSORS

BACKGROUND OF THE INVENTION

1. Field of the Invention

The present invention relates to a multiprocessor type computer system having a plurality of CPUs.

2. Description of the Related Art

Recent years have seen remarkable improvement in the performance of compact computers such as personal computers and workstations. Such small computers are beginning to adopt a multiprocessor configuration using a plurality of CPUs as well as a signal processor configuration using one CPU. It is taken for granted that the performance of a computer with a signal processor configuration will reach the top soon, and a scheme of improving performance by process migration will be the mainstream.

In using a multiprocessor configuration, an increase in power consumption is inevitable. This is a big problem for a portable personal computer which needs to operate on a battery.

In a portable computer typified by a notebook personal computer, the battery operation time is an important point. It is also important for this type of computer to have a high throughput. That is, even a notebook computer needs to have the same performance as that of a general desktop computer. There has been a tendency in desktop computers toward multiprocessor configurations. This tendency is expected to accelerate.

In the field of notebook personal computers as well, therefore, in order to eliminate the difference in performance from desktop computers, the future trend would be the utilization of multiprocessor configurations. In this case, a problem is posed in terms of an increase in power consumption in the CPU section. When a plurality of CPUs simultaneously operate, the CPU section consumes power equivalent to a multiple of the number of CPUs in operation according to a simple calculation. This increase in power consumption shortens the battery operation time, adversely affecting the continuous operation time of a portable computer which is the most important point for the portable computer.

In a computer with a single-processor configuration, the power consumption of the CPU section accounts for a considerable percentage of the total power consumption of the system. It is, therefore, very important to decrease the power consumption of the CPU section. As described above, the use of a multiprocessor configuration is very effective in improving the performance of a computer, but it increases the power consumption. This makes it difficult to use a multiprocessor configuration for a portable compact computer.

SUMMARY OF THE INVENTION

It is an object of the present invention to provide a computer which can attain both a decrease in power consumption and an increase in throughput in a multiprocessor configuration, and is suitable for realization of a multiprocessor configuration in a portable computer which needs to operate on a battery.

In order to achieve the above object, according to the present invention, there is provided a computer comprising a plurality of central processing units (CPUs); a power supply for supplying power to the plurality of CPUs; parallel degree switching means for changing the number of CPUs to be simultaneously operated by controlling operation/non-operation for each of the plurality of CPUs; detecting means for detecting a type of the power supply, a heat value, and a load of a CPU in operation; and control means for controlling the parallel degree in accordance with a detection result of the detecting means and an operation environment setting set by a user or system software.

In this computer, parallel degree control can be performed in accordance with the state of the power supply, the load on each CPU, or the like. That is, when power is supplied from an AC power supply, or the maximum performance of the computer is required, a high parallel degree is set to increase the throughput, although the power consumption increases.

In contrast to this, when the computer operates on a battery, and the battery residual capacity is small, or the maximum performance of the computer is not required, a low parallel degree is set to decrease the power consumption, although the throughput decreases. In other words, the battery operation time can be prolonged.

Such control is performed in accordance with the state of the power supply and the amount of processing executed by each CPU, which are detected/determined by the computer itself, as well as settings and the like set by the user. Finer power consumption control can therefore be realized. As a result, the power consumption can be considerably decreased without decreasing the effective throughput.

In addition, a computer of the present invention includes a plurality of CPUs having different implementations. In this computer, similar to the case of the above multiprocessor configuration, the state of the power supply and the amount of processing executed by each CPU are detected by a CPU switching means to select a specific CPU to be operated.

In this case, a plurality of CPUs having different implementations have the same instruction set architecture, and are compatible with each other on the instruction level. This system uses combinations of CPUs having different implementations, e.g., a combination of a CPU having relatively low performance but having a small power consumption and a CPU having a relatively large power consumption but having high performance. At present, a semiconductor technique which is sufficiently advanced to incorporate a plurality of CPUs having different implementations (but operating under the same instruction system) into one chip has been already been established. With this technique, in a computer having a single-processor configuration as well, power consumption control can be effectively performed, and the power consumption can be considerably decreased without decreasing the effective throughput.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 is a block diagram showing the arrangement of a computer system according to the first embodiment of the present invention;

FIG. 2 is a view showing an execution process management table in an OS;

FIG. 8 is a block diagram showing the arrangement of a computer system according to the second embodiment of the present invention.

DETAILED DESCRIPTION OF THE PREFERRED EMBODIMENTS

Figures 3, 5:
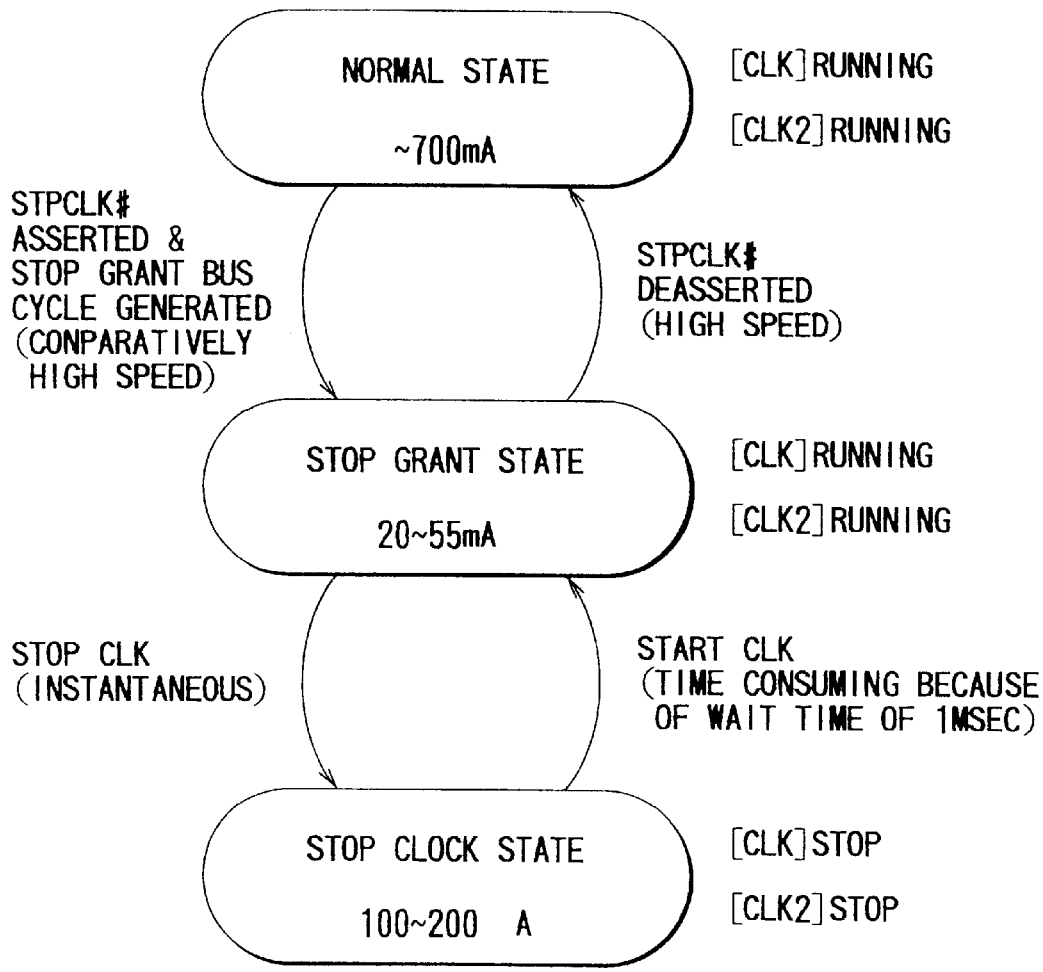
FIG. 3 is a view for explaining the three operation states of a CPU.
FIG. 5 is a view showing an example of the operation/stop data of CPUs to be managed by the computer system of the first embodiment.

A computer system according to the first embodiment of the present invention will be described below with reference to FIGS. 1 through 8;

FIG. 1 is a block diagram showing the arrangement of a computer system according to the first embodiment of the present invention. For example, this computer system is a notebook type personal computer which can be driven on a battery, and is a multiprocessor system having a 4-CPU configuration including CPUs (#0) 11 through (#3) 14 connected to a CPU 18. The CPUs 11, 12, 13, and 14 respectively have thermistors 111, 121, 131, and 141, each used to measure the heat value of a CPU in operation. Outputs from the thermistors 111, 121, 131, and 141 are supplied to a power supply microcomputer 39 (to be described later).

A system controller 15 is connected to the CPU 18 and a system bus 19, and is also connected to the CPUs (#0) 11 through (#3) 14 and a main memory 17 to control the CPUs (#0) 11 through (#3) 14 and the main memory 17 and to interface between the CPU 18 and the system bus 19. The system controller 15 has an interrupt controller 16 to control the number of CPUs, of the CPUs (#0) 11 through (#3) 14, which are to be simultaneously operated. The interrupt controller 16 controls operation/stop processes for the above four CPUs (#0) 11 through (#3) 14 in cooperation with processor management software (parallel degree switching control software) stored in the main memory 17. More specifically, the interrupt controller 16 controls the number of CPUs to be simultaneously operated in accordance with the type of power supply 21 (to be described later), CPU heat values (CPU temperatures) or the heat value of the computer, and the load state (the amount of processing performed by the CPUs) of the CPUs, or system environment settings and the like set by a user or system software. As a means for setting an operation environment, each environment parameter may be described in config.sys when DOS is used as an OS; SYSTEM.INI, for WINDOWS 3.1; and registry, for WINDOWS 95.

In addition, the interrupt controller 16 has a function of controlling the supply of a clock signal and power to each CPU under the control of the parallel degree switching control software.

The main memory 17 stores a process management table 23, process management software (parallel degree switching control software) 25, processor load measuring software 27, load data (of each processor) 29, heat value measuring software 31, heat value (of each processor) 33, system operation environment setting data 35, and CPU operation stop data 37.

The power supply microcomputer 39 is connected to an AC adapter 41 and a battery 43. The power supply microcomputer 39 is also connected to the thermistors 111, 121, 131, and 141 to receive the heat values of CPUs in operation. When the heat value of the computer is to be measured instead of the heat value of each CPU, one or a plurality of temperature sensors such as thermistors may be set on the housing (not shown) of the computer to measure the computer temperature, or the temperature of air blown out of the housing by a blower may be measured to measure the computer temperature.

The power supply microcomputer 39 has a memory area 391 for storing data indicating the type of power supply (the AC adapter 41 or the battery 43), and a memory area 392 for storing the residual capacity of the battery 43.

As shown in FIG. 2, the process management table 23 is constituted by a process number 23a, an execution processor number 23b, a program counter 23c, a stack pointer 23d, general registers 1 23e through n 23e, floating point operation registers 1 23f through n 23f, an integer operation flag save area 23g, and a floating point operation flag save area 23h.

A method of determining operation/non-operation (including a stop grant state and a stop clock state as well as the stop of the power supply to each CPU) for each of the four CPUs (#0) 11 through (#3) 14 will be described below, together with a method of making a transition from the operation state to the non-operation state or a transition from the non-operation state to the operation state.

As the CPUs 11, 12, 13, and 14, for example, microprocessors SL Enhanced Intel 1486 or Pentiums available from Intel, U.S. are used. Each of the CPUs (#0) 11 through (#3) 14 incorporates a PLL circuit. On the basis of an external clock CLK, this PLL circuit generates an internal clock CLK 2 having a clock rate equal to or higher than that of the external clock CLK. As shown in FIG. 3, each of the CPUs 11, 12, 13, and 14 has three operation states with different power consumptions, i.e., a normal state, a stop grant state, and a stop clock state.

The normal state is the normal operation state of the CPU 11. An instruction is executed in this normal state. In the normal state, the power consumption is the highest, and the current consumption is up to about 700 mA.

In the stop clock state, the power consumption is the lowest, and the current consumption is about 100 to 200 $\mu$A. In the stop clock state, the execution of an instruction is stopped, and the external clock CLK and the internal clock CLK 2 are also stopped.

The stop grant state is an operation state between the normal state and stop clock state. In the stop grant state, the current consumption is about 20 to 55 mA, which is relatively low. In the stop grant state, no instruction is executed. Although both the external clock CLK and the internal clock CLK 2 are in the running state, the supply of the internal clock CLK 2 to a CPU internal logic (CPU core) is inhibited. In the stop grant state, the external clock can be stopped. When the external clock CLK is stopped in the stop grant state, the CPU 11 shifts from the stop grant state to the stop clock state.

A transition between the normal state and the stop grant state can be made at a high speed by using a stop clock (STPCLK#) signal.

More specifically, when the STPCLK# signal supplied to each of the CPUs 11, 12, 13, and 14 is enabled, i.e., set in the active state, in the normal state, each CPU executes a stop grant cycle to shift from the normal state to the stop grant state upon completion of a currently executed instruction without executing the next instruction. When the STPCLK# signal is disabled, i.e., set in the inactive state, in the stop grant state, each of the CPUs 11, 12, 13, and 14 shifts from the stop grant state to the normal state to restart execution of the next instruction.

A transition from the stop grant state to the stop clock state is instantaneously made by stopping the external clock CLK. When the supply of the external CLK to each of the CPUs 11, 12, 13, and 14 is restarted in the stop clock state, each CPU shifts to the stop grant state after the lapse of 1 ms. As described above, it takes time to restore the normal state from the stop clock state.

As described above, the power consumed in the stop grant state is much lower than that in the normal state. In addition, restoration of each CPU to the normal state, i.e., the instruction executing state, can be performed at a high speed by using the STPCLK# signal. For this reason, as a function of lowering the operation speed of each CPU, the stop grant state is used.

When the system is started or restarted, the parallel degree switching control software 25 determines the operation states of the four CPUs (#0) 11 through (#3) 14 in accordance with the previously determined data. For example, this data includes the operation environment data and default data of the system which are designated by the user or system software, or data taking over the state immediately before system down or suspension.

After this operation, the process management software 25 determines operation/non-operation for the four CPUs (#0) 11 through (#3) 14 in accordance with the following rules.

(1) When power is supplied from an AC power supply to the system, all the CPUs (#0) 11 through (#3) 14 are set in the operation state.

(2) When power is supplied from a battery, instead of an AC power supply, to the system, the residual capacity of the battery is checked. If the residual capacity is equal to or higher than a given percentage, all the CPUs (#0) 11 through (#3) 14 are set in the operation state.

If the residual capacity is lower than the given percentage, one or plurality of CPUs are shifted to the non-operation state depending on the degree of the residual capacity. Ultimately, only one CPU is set in the operation state.

(3) The temperatures around the CPUs (#0) 11 through (#3) 14 are measured by the temperature sensors 111, 121, 131, and 141 such as thermistors arranged near the CPUs to check the heat value of each CPU in operation. The number of CPUs to be operated is then determined in accordance with the measured temperatures and a predetermined threshold. An algorithm to be used for this determination process will be described later.

(4) The load on each CPU, i.e., the amount of processing performed by each CPU, is measured by the known processor load measuring software 27. The number of CPUs to be operated when the processing amount is larger is set to be larger than that when the processing amount is small (the idle state such as the key input wait state). UNIX as an OS has a function of measuring the above CPU processing amount. If, therefore, UNIX is to be used, the CPU processing amount may be measured by using this function.

In order to realize these control operations, the power supply microcomputer 39 receives the following data:

power supply type: data indicating whether power is supplied from an AC power supply or a battery battery residual capacity: data indicating the residual capacity of a battery (in this embodiment, this data is represented by B%, i.e., expressed in percentage)

CPU temperature: a result obtained by measuring the temperature of each CPU (in this embodiment, the CPU temperature is represented by T° C., i.e., measured in centigrade temperature CPU processing amount: data indicating the amount of tasks processed by each CPU, and represented by W0, W1, W2, and W3

Various methods may be used to measure the CPU processing amount. For example, there is provided a method of determining the CPU processing amount on the basis of the interrupt amount for each CPU, or a method of determining the CPU processing amount by tracing the address values output from each CPU and determining whether the CPU is in the idle state. For example, when an interrupt occurs, a value is set in a given parameter, and the intervals at which interrupts occur are relatively determined. The frequency data of interrupts is updated in real time, and parallel degree switching is performed. When an event occurs, all the parameters are checked to determine which CPU has the largest amount of processing.

The number of CPUs to be operated at time T is determined on the basis of these data. In this case, the threshold values for the battery residual capacity and CPU temperature are set in several steps in advance to determine the number of CPUs to be operated.

For example, the following threshold values are set:

| Battery Residual Capacity | Number of CPUs |
| --- | --- |
| 76%–100% | 4 |
| 51%–75% | 3 |
| 26%–50% | 2 |
| 1%–25% | 1 |

| CPU Temperature | Number of CPUs |
| --- | --- |
| 76° C. or more | 1 |
| 51–75° C. | 2 |
| 26–50° C. | 3 |
| 25° C. or less | 4 |

Assume that the system operation environment setting (the number of CPUs to be operated) set by the user or the system software does not coincide with the number of CPUs to be operated which is determined on the basis of the battery residual capacity or the CPU temperature. In this case, a message is displayed to allow the user to make a final decision. If the user wants to give priority to performance over the operation time, the number of CPUs which is determined by the user can be operated. If the user wants to give priority to operation time over performance, the number of CPUs which is determined by the system can be operated.

Figure 4:
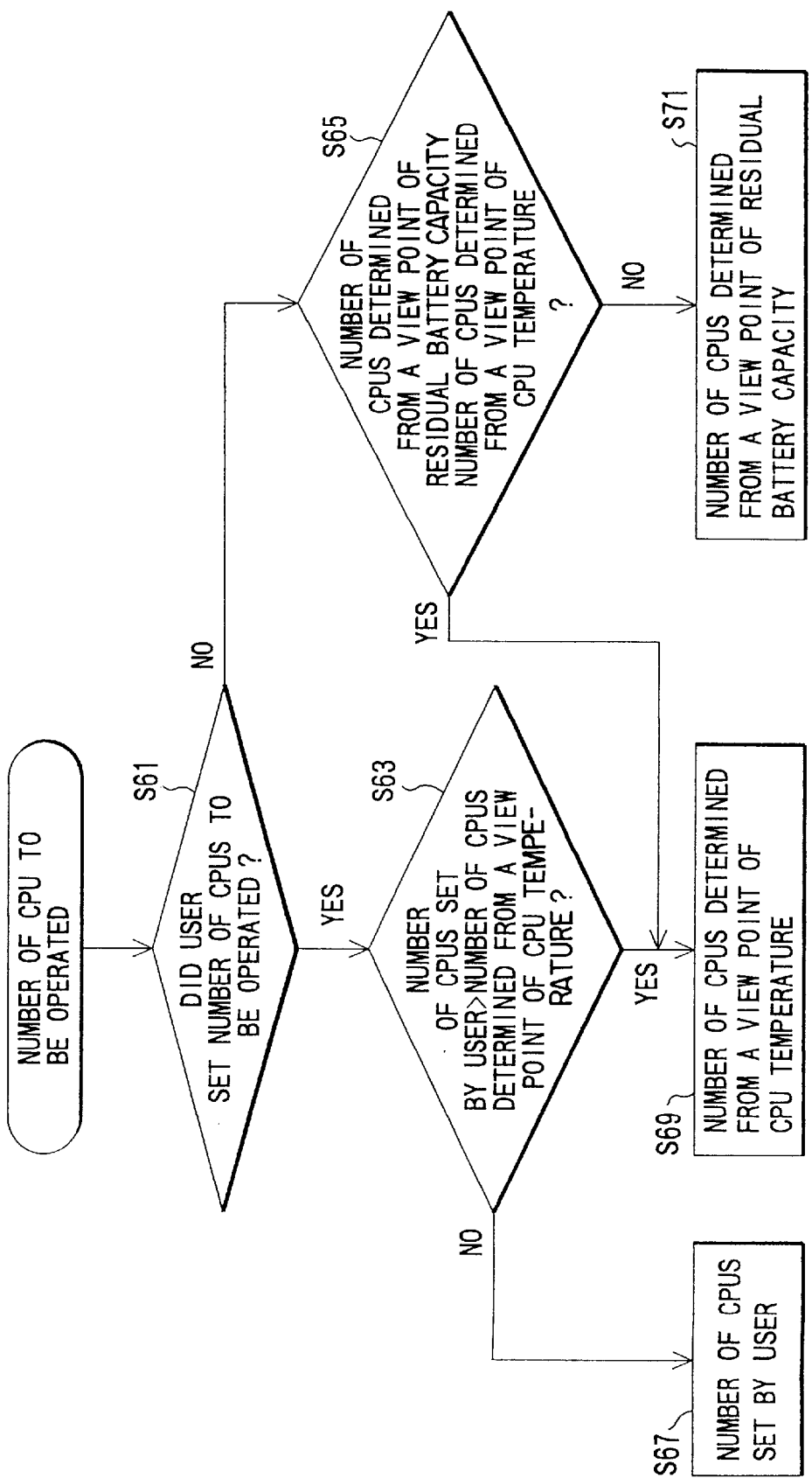
FIG. 4 is a flow chart showing an algorithm for determining the number of CPUs to be operated on the basis of various parameters.

FIG. 4 is a flow chart showing an algorithm for determining the number of CPUs to be operated. As shown in FIG. 4, the OS checks whether the user has set the number of CPUs to be operated (step S61). If the OS determines that the user has set the number of CPUs, the OS compares the number of CPUs set by the user with the number of CPUs determined from the CPU temperature (step S63). If the number of CPUs set by the user is larger than that determined from the CPU temperature, the OS gives priority to the number of CPUs determined from the CPU temperature (step S69).

If the number of CPUs set by the user is equal to or smaller than the number of CPUs determined from the CPU temperature, the OS gives priority to the number of CPUs set by the user.

If it is determined in step S61 that the user has not set the number of CPUs to be operated, the OS compares the number of CPUs determined from the battery residual capacity with the number of CPUs determined from the CPU temperature in step S65. If the number of CPUs determined from the battery residual capacity is larger than the number of CPUs determined from the CPU temperature, the OS gives priority to the number of CPUs determined from the CPU temperature (step S69). On the contrary, if the number of CPUs determined from the battery residual capacity is equal to or smaller than the number of CPUs determined from the CPU temperature, the OS gives priority to the number of CPUs determined from the battery residual capacity (step S71).

The parallel degree switching control software 25 has the CPU operation/stop data shown in FIG. 5, and monitors the current operation state of each CPU.

The parallel degree switching control software 25 determines CPU operation/stop data at next time T2 on the basis of the CPU operation/stop data at time T1 and the above input data. In this case, some means is used to cause an interrupt with respect to a CPU for which a shift from the operation state to the stop state or a shift from the stop state to the operation state is required. In this embodiment, operation shifts are performed by using interrupt lines INTR 1 through INTR 3.

A sequence of stopping a CPU in operation will be described first.

Figure 6:
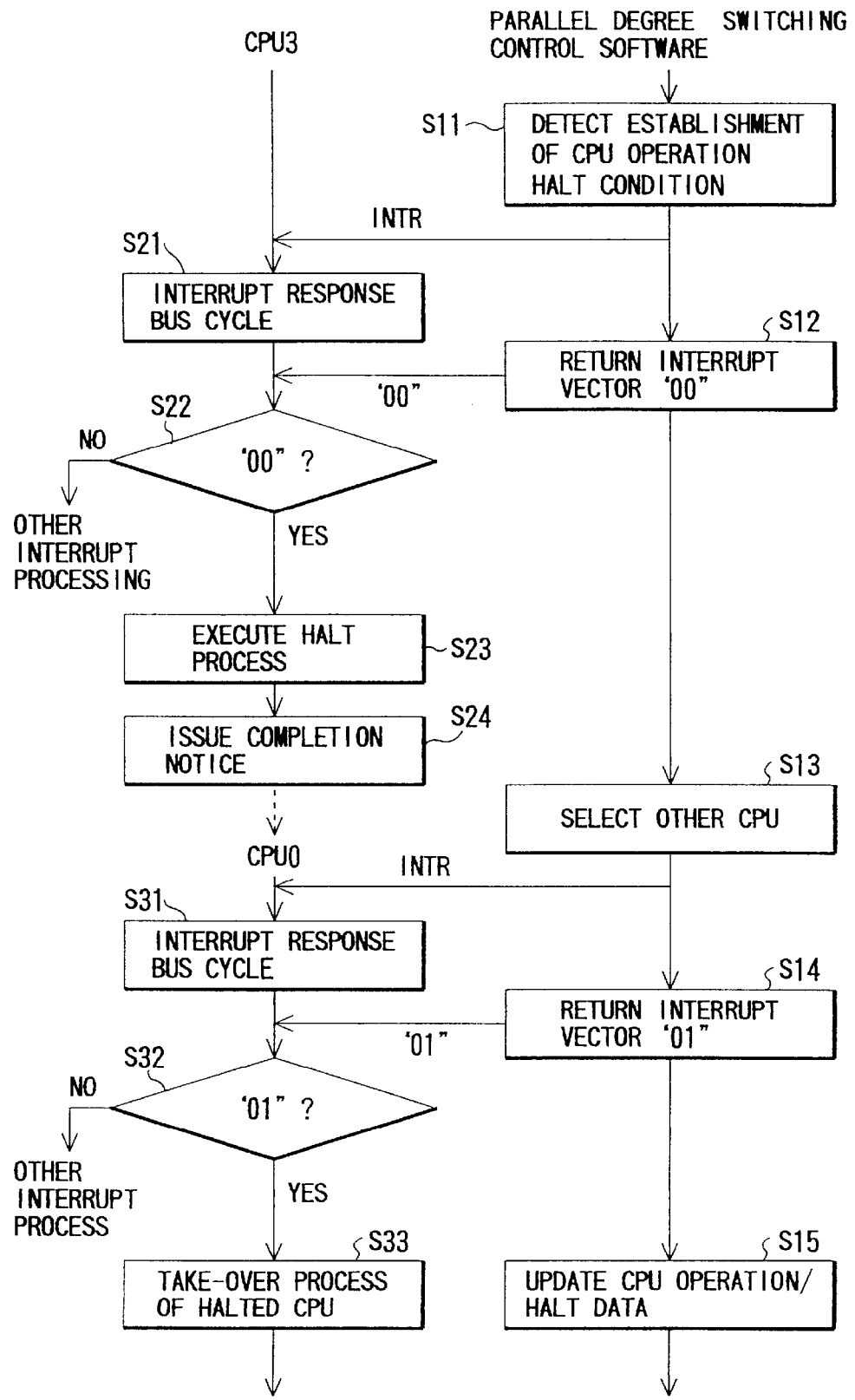
FIG. 6 is a flow chart for explaining a procedure for stopping a CPU in operation in the computer system of the first embodiment.

A sequence of stopping CPU #3 will be described below with reference to FIG. 6.

(1) Upon detection of the establishment of a CPU operation halt condition, the parallel degree switching control software 25 activates an interrupt signal INTR 3 for CPU #3 (step S11).

(2) CPU #3 immediately enters an interrupt response sequence, and issues an interrupt response bus cycle to acquire an interrupt vector (step S21).

(3) The system side including the parallel degree switching control software 25 returns data "00" indicating a halt request, as an interrupt vector, to CPU #3 (step S12).

(4) Upon recognizing the data as an interrupt for the halt request, CPU #3 immediately shifts to a halt process (steps S22 and S23).

(5) The halt process is performed as follows. Before CPU #3 is stopped, the process which has been performed by CPU #3 must be taken over by other CPUs. For this reason, CPU #3 stores its internal state in the process management table 23 in the main memory 17. The internal state of CPU #3 includes a program counter, a stack pointer, various general registers, floating point operation registers, various operation flags, and the like. If CPU #3 has an internal cache memory, the cache memory is flashed, and its data is written in the main memory 17. If, however, CPU #3 has a bus watch function, and is set in the stop clock state, a cache flash process may be omitted. The internal state of CPU #3 is saved at an address in the main memory 17 which is determined from the viewpoint of the system.

(6) When the process in (5) is completed, CPU #3 notifies the interrupt controller 16 of the completion of the process by some method (step S24). For example, CPU #3 may use a method of performing an I/O write operation with respect to an I/O register in the interrupt controller 16. More specifically, upon completion of a process, CPU #3 rewrites a corresponding bit in the I/O register from "0" to "1". If CPU #0 is operating as the OS, CPU #0 polls the I/O register to know the completion of the process in CPU #3.

(7) The parallel degree switching control software 25 selects a CPU for a take-over process from other CPUs in operation to let it take over the process performed by CPU #3 (step S13). As a selection method, the parallel degree switching control software 25 may use a method of selecting a CPU who has least recently taken over the process, or a method of selecting a CPU having the smallest task amount at a given moment by measuring the above interrupt amount or the like and letting the CPU take over the process. The load amount of each CPU can be checked by using the OS or other known methods.

(8) The interrupt controller 16 causes an interrupt with respect to the CPU which is to take over the process performed by CPU #3. In this case, CPU #0 is selected, and INTR 0 is activated.

(9) CPU #0 immediately makes an interrupt response (step S31). The interrupt controller 16 returns the interrupt vector "01" (task take-over) (step S14).

(10) CPU #0 updates the execution process management table and inserts a new task. Thereafter, CPU #0 loads data of the internal state of CPU #3 other than the program counter from a predetermined address in the main memory (returns data from the management table to the CPU). Finally, the flow branches to the address of the program counter stored as the internal state of CPU #3 (return from interrupt) (steps S32 and S33). If the program counter is loaded first, the CPU which is to take over the task branches to the execution address indicated by the program counter before all the data required for the take-over process are completely transferred, resulting in an operation error.

(11) With the above operation, CPU #0 can completely take over the process which has been performed by CPU #3.

(12) When the process in (6) is completed, CPU #3 is stopped. This state is maintained until an "execution start" interrupt is received.

After this operation, the interrupt controller 16 may stop the supply of clocks to CPU #3, or may stop the supply of power to CPU #3. Finally, the interrupt controller 16 sets the bit of CPU operation/stop data which is associated with CPU #3 to "0" (stop).

Figure 7:
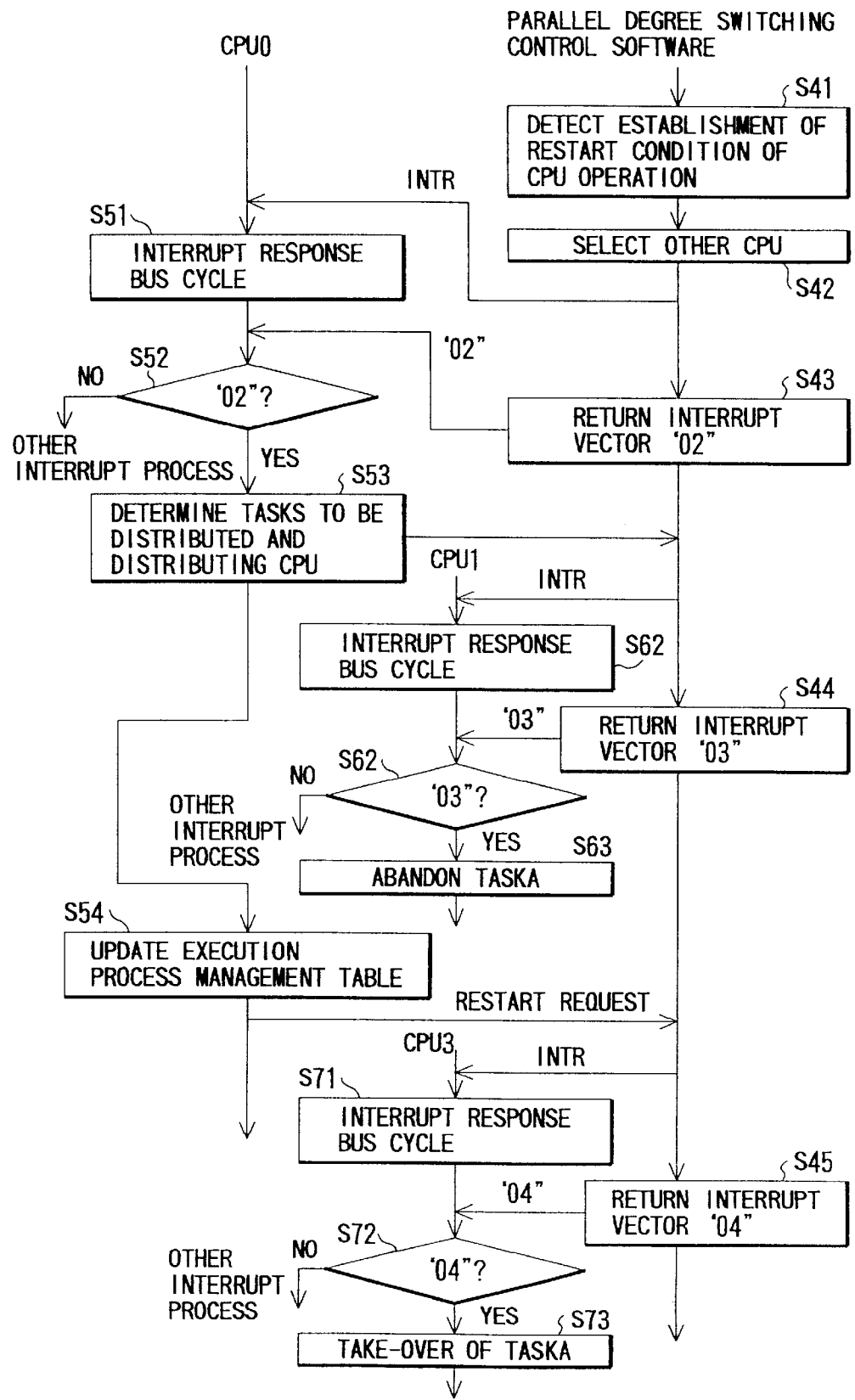
FIG. 7 is a flow chart for explaining a procedure for starting a CPU at halt in the computer system of the first embodiment.

A sequence of resuming the operation of a CPU at halt will be described next with reference to FIG. 7.

In this case, the operation of CPU #3 is restarted.

(1) When software detects the establishment of the restart condition of CPU operation (e.g., the OS detects AC power supply connection) (step S41), the interrupt controller 16 selects a CPU other than CPU #3 whose operation is to be restarted, e.g., CPU #0 (step S42). The interrupt controller 16 generates an interrupt with respect to CPU #0 and returns an interrupt vector "2" (step S43) in response to an interrupt response bus cycle executed by CPU #0 (step S51). The vector "2" indicates a task distribution instruction interrupt. This task distribution instruction may be an instruction to distribute one task to a plurality of processors when the OS is designed to support a multi-thread system, or an instruction to assign a processor to each task when the OS does not support a multi-thread system.

(2) CPU #0 immediately checks the process management table 23 and determines which task is to be executed by CPU #3 (steps S52 and S53). As a result of this determination, CPU #0 determines that a task A currently executed by the CPU "1 is to be executed by CPU #3.

(3) When the task A is to be shifted from CPU #1 to CPU #0, an I/O write operation or the like is performed to make the interrupt controller 16 generate an interrupt with respect to CPU #1 so as to make CPU #1 abandon the task A. CPU #1 immediately starts an interrupt response cycle (step S61). In response to this operation, the interrupt controller 16 returns a vector "3" (step S44).

(4) The vector "3" indicates task abandonment. CPU #1 saves the current internal state in the main memory 17.

(5) CPU #0 updates the process management table 23 and inserts a new task for CPU #3 (step S54)

(6) CPU #0 makes the interrupt controller 16 generate an interrupt with respect to CPU #3. As a result, CPU #3 obtains a vector "4" (task start) (steps S71 and S45).

CPU #3 loads data of the current internal state of CPU #1 other than the program counter from the main memory 17, and makes a branch to the address of the stored program counter (return from interrupt) (steps S72 and S73). With this operation, CPU #3 takes over the task A executed by CPU #1.

In the above case, CPU #0 issues a task distribution instruction interrupt to allow CPU #3 to take over the task executed by CPU #1. This operation applies to a case wherein three or more CPUs are in operation. If, however, only two CPUs (e.g., the CPUs #1 and #0) are in operation, CPU #1 issues a task distribution instruction interrupt to make CPU #3 take over a task executed by CPU #1.

As described above, in the system of the first embodiment, parallel degree control can be performed in accordance with the state of a power supply, the load on each CPU, and the like. When power is supplied from an AC power supply, or the computer need to exhibit the maximum performance, a high parallel degree is set to improve the throughput, although the power consumption increases.

On the contrary, if the computer operates on a battery, and the battery residual capacity is small, or the computer need not exhibit the maximum performance, a low parallel degree is set to decrease the power consumption, although the throughput decreases. In other words, the life of the battery can be prolonged.

When the number of CPUs to be simultaneously operated is to be controlled by system operation environment setting or the like performed by the user or the system software, a high-speed operation mode and a low power consumption mode are prepared. When the high-speed operation mode is selected as a system operation environment, all the CPUs may be operated. When the low power consumption mode is selected, only some CPUs may be operated.

The number of CPUs to be simultaneously operated is dynamically performed in accordance with the state of a power supply or the amount of processing performed by each CPU, which are detected and determined by the computer itself, as well as environment settings and the like set by the user. This allows finer power consumption control. As a result, the power consumption can be considerably decreased without decreasing the effective throughput.

In the above embodiment, parallel degree switching control is performed by using the parallel degree switching control software 25 for executing a sequence for an operation stop/operation restart process, which is described with reference to FIGS. 6 and 7, the interrupt controller 16 for controlling the supply of clocks and power for each of the four CPUs (#0) 11 through (#3) 14, and the like. However, all the above functions can be realized by hardware, software, or a dedicated microcomputer.

The second embodiment of the present invention will be described next with reference to FIG. 8. Note that the same reference numerals in the second embodiment denote the same as in the first embodiment.

Similar to the first embodiment, this system has four CPUs (#0) 11 through (#3) 14. However, the system uses a single-processor configuration in which a plurality of CPUs do not simultaneously operate, but one of the CPUs is selected to operate.

The CPUs (#0) 11 through (#3) 14 are microprocessors designed on the basis of the same instruction set architecture. The order of the CPUs in terms of throughput is:

CPU #3>CPU #2>CPU #1>CPU #0

The order of the CPUs in terms of power consumption is the same as the above order. That is, CPU #3 is suitable for a task demanding a high throughput, and CPU #0 is suitable for a task demanding a low power consumption.

In this system, a CPU switching section 26 performs a CPU switching operation in accordance with the type of power supply for the system, the heat value, and the load state of a CPU in operation, or the state of system operation environment settings and the like set by a user or system software. Similar to the interrupt controller 16, the CPU switching section 26 is a block for managing operation/non-operation for each of the CPUs (#0) 11 through (#3) 14, and controlling the supply of a clock signal and power to each CPU.

A case wherein CPUs are switched in accordance with the state of a power supply will be described below.

(1) Assume that CPU #3 having the highest throughput is executing a task at time T1. Also, assume that switching to the mode of supplying power from a battery to the system is performed at time T2.

(2) A CPU switching control software 24 detects the shift to the battery operation, and performs the following process to switch from the currently operated CPU to a CPU having a low power consumption.

(3) The interrupt controller 16 generates an interrupt with respect to CPU #3 in operation.

(4) CPU #3 immediately enters an interrupt response cycle and obtains an interrupt vector "10". The vector "10" indicates an operation halt request.

(5) A halt process is performed in the following manner. Before CPU #3 is stopped, the process performed by CPU #3 must be taken over by another CPU. For this reason, CPU #3 stores its internal state in the main memory 17. The internal state of the CPU includes a program counter, a stack pointer, various general registers, floating point operation registers, various operation flags, and the like. If CPU #3 has an internal cache memory, the cache memory is flashed, and its data is written in the main memory 17. If, however, CPU #3 has a bus watch function, and is set in the stop clock state, a cache flash process may be omitted. The internal state of CPU #3 is saved at an address in the main memory 17 which is determined from the viewpoint of the system.

(6) When the process in (5) is completed, CPU #3 notifies the interrupt controller 16 of the completion of the process by some method. For this operation, for example, CPU #3 may use a method of performing an I/O write operation with respect to an I/O register in the interrupt controller 16.

(7) The interrupt controller 16 determines under the control of the CPU switching control software 24 that the process performed by CPU #3 is taken over by CPU #2 which has a lower power consumption than CPU #3, and generates an interrupt with respect to CPU #2.

(8) CPU #2 immediately enters an interrupt response cycle, and obtains an interrupt vector "01". The vector "01" indicates task take-over.

(9) CPU #2 updates an execution process management table 23, and inserts a new task. Thereafter, CPU #2 loads data of the internal state of CPU #3 other than the program counter from a predetermined address in the main memory 17. Finally, CPU #2 makes a branch to the address of the program counter stored as the internal state of CPU #3 (return from interrupt).

(10) With this operation, the process performed by CPU #3 can be completely shifted to CPU #2.

(11) When the process in (6) is completed, CPU #3 is stopped, and this state is maintained until an execution start interrupt is received.

The interrupt controller 16 may stop the supply of a clock to CPU #3 or stop the supply of power to CPU #3 afterward under the control of the CPU switching control software 24. The interrupt controller 16 finally sets a bit of CPU operation/stop data (FIG. 3) associated with CPU #3 to "0 (stop)" under the control of the CPU switching control software 24, and sets a bit associated with CPU #2 to "1". Note that the control operation of the CPU switching control software 24 can be realized by the same control as that shown in FIGS. 6 and 7.

As described above, the system of the second embodiment has a plurality of CPUs having different implementations. As in the multiprocessor configuration of the first embodiment, the state of a power supply and the amount of processing performed by each CPU are detected by the interrupt controller 16 in cooperation with the CPU switching control software 24 to select a specific CPU to be operated. In this case, a plurality of CPUs having different implementations have the same instruction set architecture, and are compatible with each other on the instruction level. In addition, the system uses CPUs having different implementations, including a CPU having relatively low performance but having a low power consumption, and a CPU having a large power consumption but having high performance. At present, a semiconductor technique which is sufficiently advanced to incorporate a plurality of CPUs having different implementations into one chip has been already been established. With this technique, in a computer having a single-processor configuration as well, power consumption control can be effectively performed, and the power consumption can be considerably decreased without decreasing the effective throughput.

In the above embodiment, in order to stop a CPU operation, the supply of a clock to the CPU is stopped. However, the supply of power to the CPU may be stopped. In addition, the embodiment exemplifies a CPU available from Intel, U.S. However, the present invention can be applied to CPUs manufactured by a maker other than Intel.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A multiprocessor type computer system, comprising:

a plurality of central processing units (CPUs) for parallel processing; and parallel degree switching means for changing the number of CPUs to be simultaneously operated by controlling operation/non-operation for each of said plurality of CPUs by having one CPU take over a process performed by another CPU depending on an occurrence of an event regarding power management of the computer system, said parallel degree switching means further including means for changing the number of CPUs to be simultaneously operated by controlling operation/non-operation for each of said plurality of CPUs by a predetermined algorithm comprising the operations of:

comparing the number of CPUs set by a user with the number of CPUs determined from a CPU temperature, and giving priority to the number of CPUs determined from the CPU temperature if the number of CPUs set by the user is larger than that determined from the CPU temperature; and comparing the number of CPUs determined from a battery residual capacity with the number of CPUs determined from the CPU temperature if it is determined that the user has not set the number of CPUs to be operated, and giving priority to the number of CPUs determined from the CPU temperature if the number of CPUs determined from the battery residual capacity is larger than the number of CPUs determined from the CPU temperature.

2. A system according to claim 1, wherein said parallel degree switching means comprises means for detecting a heat value of said computer or a heat value of each of said CPUs, and means for dynamically changing the parallel degree in accordance with the heat value.

3. A system according to claim 1, wherein said power supply comprises means for detecting that said power supply is an AC power supply or a battery, and said parallel degree switching means comprises means for setting the parallel degree to be high when said power supply is an AC power supply, and setting the parallel degree to be low when said power supply is a battery.

4. A system according to claim 1, further comprising means for detecting a residual capacity of a battery, and wherein said parallel degree switching means comprises means for, when said power supply is a battery, changing the parallel degree in accordance with the residual capacity of the battery.

5. A system according to claim 1, wherein said parallel degree switching means comprises means for changing the parallel degree in accordance with a load state of a CPU in operation.

6. A system according to claim 1, wherein said parallel degree switching means comprises means for controlling supply of a clock signal or power to each of said CPUs, and means for stopping supply of a clock or power to a CPU at halt.

7. A system according to claim 1, wherein said plurality of CPUs comprise CPUs having the same power consumption and the same performances.

8. A system according to claim 1, wherein said plurality of CPUs comprise CPUs having different power consumptions or different performances.

9. The system according to claim 1, further comprising a process management table constituted by a process number, an execution process number, a program counter, a stack pointer, general registers, floating point operation registers, an integer operation flag save area, and a floating point operation flag save area, and the parallel degree switching means performs the take over from one CPU to another CPU by using the process table.

10. The system according to claim 1, wherein said parallel degree switching means includes CPU operation/stop data indicating operation/stop of each CPU, and monitors the current operation state of each CPU.

11. The system according to claim 1, wherein said parallel degree switching means further includes means for changing the number of CPUs to be simultaneously operated by controlling operation/non-operation for each of said plurality of CPUs by performing a predetermined algorithm comprising the operations of:

upon detection of the establishment of a CPU operation halt condition, the parallel degree switching means activates an interrupt signal to a CPU to be ceased (CPU A);

CPU A issues an interrupt response bus cycle to acquire an interrupt vector;

the parallel degree switching means returns data indicating a halt request, as an interrupt vector, to the CPU A;

CPU A saves, in response to the data indicating a halt request, its internal state including a program counter, a stack pointer, various general registers, floating point operation register, and various operation flags, into a process management table;

the parallel degree switching means selects a CPU for a take-over process (CPU B) from other CPUs in operation to let it take over the process performed by the CPU A, and interrupts the CPU B;

the CPU B makes an interrupt response in response to the interrupt;

the parallel degree switching means returns the interrupt vector indicating task take-over to the CPU B; and the CPU B updates the process management table, loads the internal state of the CPU A, and branches to an address of the program counter stored as the internal state of the CPU A.

12. The system according to claim 1, further comprising:

a power supply for supplying power to said plurality of CPUs; and means for stopping a supplement of power from the power supply to a non-operated CPU.

13. The system according to claim 1 further comprising means for changing a speed of at least one of said plurality of CPUs in accordance with occurrence of the event regarding power management of the computer system.

14. A multiprocessor type computer system, comprising:

a plurality of CPUs having different power consumptions and different throughputs;

means for measuring a temperature of each of said CPUs;

means for calculating a load on each of said CPUs;

means for setting an operation environment; and

CPU switching means for switching CPUs by having one CPU take over a process performed by another CPU depending on an occurrence of an event regarding power management of the computer system, the CPU switching means further including means for changing the number of CPUs to be simultaneously operated by controlling operation/non-operation for each of said plurality of CPUs by a predetermined algorithm comprising the operations of:

comparing the number of CPUs set by a user with the number of CPUs determined from a CPU temperature, and giving priority to the number of CPUs determined from the CPU temperature if the number of CPUs set by the user is larger than that determined from the CPU temperature; and comparing the number of CPUs determined from a battery residual capacity with the number of CPUs determined from the CPU temperature if it is determined that the user has not set the number of CPUs to be operated, and giving priority to the number of CPUs determined from the CPU temperature if the number of CPUs determined from the battery residual capacity is larger than the number of CPUs determined from the CPU temperature.

15. A system according to claim 14, wherein said power supply comprises an AC power supply or a battery, and said switching means comprises means for operating a CPU having a high throughput when said power supply is an AC power supply, and for operating a CPU having a lower power consumption when said power supply is a battery.

16. A system according to claim 14, wherein said power supply comprises a battery, and means for detecting a residual capacity of the battery, and said CPU switching means comprises means for operating a CPU having a high throughput when the battery residual capacity detected by said detection means is smaller than a predetermined value, and for operating a CPU having a low power consumption when the battery residual capacity is not more than the predetermined value.

17. A system according to claim 14, wherein said CPU switching means comprises means for detecting a heat value of said computer or a heat value of each of said CPUs, and means for switching CPUs to be operated in accordance with the heat value.

18. A system according to claim 14, wherein said CPU switching means comprises means for controlling supply of a clock signal or power to each of said CPUs, and stops supply of a clock or power to a CPU at halt.

19. The system according to claim 14, further comprising a process management table constituted by a process number, an execution process number, a program counter, a stack pointer, general registers, floating point operation registers, an integer operation flag save area, and a floating point operation flag save area, and the CPU switching means performs the take over from one CPU to another CPU by using the process table.

20. The system according to claim 14, wherein said CPU switching means includes CPU operation/stop data indicating operation/stop of each CPU, and monitors the current operation state of each CPU.

21. The system according to claim 14, wherein said CPU switching means further includes means for changing the number of CPUs to be simultaneously operated by controlling operation/non-operation for each of said plurality of CPUs by performing a predetermined algorithm comprising the operations of:

upon detection of the establishment of a CPU operation halt condition, the CPU switching means activates an interrupt signal to a CPU to be ceased (CPU A);

CPU A issues an interrupt response bus cycle to acquire an interrupt vector;

the CPU switching means returns data indicating a halt request, as an interrupt vector, to the CPU A;

CPU A saves, in response to the data indicating a halt request, its internal state includes a program counter, a stack pointer, various general registers, floating point operation register, and various operation flags, into a process management table;

the CPU switching means selects a CPU for a take-over process (CPU B) from other CPUs in operation to let it take over the process performed by the CPU A, and interrupts the CPU B;

the CPU B makes an interrupt response in response to the interrupt;

the CPU switching means returns the interrupt vector indicating task take-over to the CPU B; and the CPU B updates the process management table, loads the internal state of the CPU B, and branches to an address of the program counter stored as the internal state of the CPU A.

22. The system according to claim 14, further comprising:

a power supply for supplying power to each of the CPUs; and means for stopping a supplement of power from the power supply to a non-operated CPU.

23. A multiprocessor type computer system, comprising:

a plurality of central processing units (CPUs) for parallel processing;

a process management table constituted by a process number, an execution process number, a program counter, a stack pointer, general registers, floating point operation registers, an integer operation flag save area, and a floating point operation flag save area; and parallel degree switching means for changing the number of CPUs to be simultaneously operated by controlling operation/non-operation for each of said plurality of CPUs by having one CPU take over a process performed by another CPU by using the process management table memory and depending on an occurrence of an event regarding power management of the computer system, said parallel degree switching means further including means for changing the number of CPUs to be simultaneously operated by controlling operation/non-operation for each of said plurality of CPUs by a predetermined algorithm comprising the operations of:

comparing the number of CPUs set by a user with the number of CPUs determined from a CPU temperature, and giving priority to the number of CPUs determined from the CPU temperature if the number of CPUs set by the user is larger than that determined from the CPU temperature; and comparing the number of CPUs determined from a battery residual capacity with the number of CPUs determined from the CPU temperature if it is determined that the user has not set the number of CPUs to be operated, and giving priority to the number of CPUs determined from the CPU temperature if the number of CPUs determined from the battery residual capacity is larger than the number of CPUs determined from the CPU temperature.

24. The system according to claim 23, further comprising:

a power supply for supplying power to each of the CPUs; and means for stopping a supplement of power from the power supply to a non-operated CPU.

25. A multiprocessor type computer system, comprising:

a plurality of central processing units (CPUs) for parallel processing; and parallel degree switching means for changing the number of CPUs to be simultaneously operated by controlling operation/non-operation for each of said plurality of CPUs by a predetermined algorithm comprising the operations of:

comparing the number of CPUs set by a user with the number of CPUs determined from a CPU temperature, and giving priority to the number of CPUs determined from the CPU temperature if the number of CPUs set by the user is larger than that determined from the CPU temperature; and comparing the number of CPUs determined from a battery residual capacity with the number of CPUs determined from the CPU temperature if it is determined that the user has not set the number of CPUs to be operated, and giving priority to the number of CPUs determined from the CPU temperature if the number of CPUs determined from the battery residual capacity is larger than the number of CPUs determined from the CPU temperature.

26. The system according to claim 25, further comprising:

a power supply for supplying power to each of the CPUs; and means for stopping of supplement of power from the power supply to a non-operated CPU.

27. A multiprocessor type computer system, comprising:

a plurality of central processing units (CPUs) for parallel processing;

a memory storing CPU operation/stop data indicating operation or stop state of each CPU; and parallel degree switching means for changing the number of CPUs to be simultaneously operated by controlling operation/non-operation for each of said plurality of CPUs by monitoring the current operation state of each CPU by referring to the memory, said parallel degree switching means further including means for changing the number of CPUs to be simultaneously operated by controlling operation/non-operation for each of said plurality of CPUs by a predetermined algorithm comprising the operations of:

comparing the number of CPUs set by a user with the number of CPUs determined from a CPU temperature, and giving priority to the number of CPUs determined from the CPU temperature if the number of CPUs set by the user is larger than that determined from the CPU temperature; and comparing the number of CPUs determined from a battery residual capacity with the number of CPUs determined from the CPU temperature if it is determined that the user has not set the number of CPUs to be operated, and giving priority to the number of CPUs determined from the CPU temperature if the number of CPUs determined from the battery residual capacity is larger than the number of CPUs determined from the CPU temperature.

28. The system according to claim 27, further comprising:

a power supply for supplying power to each of the CPUs; and means for stopping a supplement of power from the power supply to a non-operated CPU.

29. The system according to claim 27, further comprising means for stopping supplement of a clock signal to at least one of said plurality of CPUs in accordance with an occurrence of an event regarding power management of the computer system.

30. A multiprocessor type computer system, comprising:

a plurality of central processing units (CPUs) for parallel processing;

a process management table constituted by a process number, an execution process number, a program counter, a stack pointer, general registers, floating point operation registers, an integer operation flag save area, and a floating point operation flag save area; and parallel degree switching means for changing the number of CPUs to be simultaneously operated by controlling operation/non-operation for each of said plurality of CPUs by performing a predetermined algorithm comprising the operations of:

upon detection of the establishment of a CPU operation halt condition, the parallel degree switching means activates an interrupt signal to a CPU to be ceased (CPU A);

CPU A issues an interrupt response bus cycle to acquire an interrupt vector;

the parallel degree switching means returns data indicating a halt request, as an interrupt vector, to the CPU A;

CPU A saves, in response to the data indicating a halt request, its internal state including a program counter, a stack pointer, various general registers, floating point operation register, and various operation flags, into a process management table;

the parallel degree switching means selects a CPU for a take-over process (CPU B) from other CPUs in operation to let it take over the process performed by the CPU A, and interrupts the CPU B;

the CPU B makes an interrupt response in response to the interrupt;

the parallel degree switching means returns the interrupt vector indicating task take-over to the CPU B; and the CPU B updates the process management table, loads the internal state of the CPU A, and branches to an address of the program counter stored as the internal state of the CPU A.

31. The system according to claim 30, further comprising:

a power supply for supplying power to each of the CPUs; and means for stopping a supplement of power from the power supply to a non-operated CPU.

* * * * *